United States Patent Office 2,777,887
Patented Jan. 15, 1957

2,777,887

PROCESS FOR PREPARING CYCLOPENTA-DIENYLSODIUM

Viktor Weinmayr, Landenberg, Pa., assignor to E. I. du Pont de Nemours and Company, Wilmington, Del., a corporation of Delaware No Drawing. Application November 24, 1953,
Serial No. 394,232

7 Claims. (Cl. 260—665)

This invention relates to an improved process for the manufacture of cyclopentadienylsodium as an intermediate for the preparation of dicyclopentadienyliron and dicyclopentadienylnickel.

Several methods are known for the preparation of cyclopentadienylsodium, but in general, they are subject to serious drawbacks, such as requiring expensive reagents, complicated apparatus, extremely low temperatures or reagents which are unstable and explosive.

It is, therefore, an object of the present invention to provide a simple and relatively inexpensive method of preparing cyclopentadienylsodium. Another object is the provision of a method for preparing cyclopentadienylsodium using commonly available reagents. A still further object is the preparation of cyclopentadienylsodium in a volatile organic liquid which is also a solvent for iron and nickel halides so the subsequent formation of the metallo dicyclopentadiene compounds is greatly facilitated. Other objects will appear as the description of the invention proceeds.

These objects are accomplished by reacting under anhydrous conditions, cyclopentadiene in the presence of an aliphatic ether having up to 6 carbon atoms in each group group with sodium in the form of a dispersion of the metal in an inert liquid.

The process is carried out in a relatively simple and convenient manner. The sodium is first dispersed in an inert organic liquid. Those described in U. S. Patent Nos. 2,635,041, 2,642,344 or 2,642,345 may be used. Among the more common compounds suitable as the inert vehicle for the sodium are liquid hydrocarbons, such as xylene, kerosene, mineral oil, and the like. The only limitations on the vehicle are that it must be a liquid, inert with respect to sodium at reaction temperature, and must not react with cyclopentadiene.

The cyclopentadiene is added slowly to the sodium dispersion in an anhydrous ether solution maintained under reflux. Cyclopentadiene may be readily obtained by distilling it from its dimer dicyclopentadiene. As the reaction proceeds, hydrogen is evolved vigorously and the mass becomes thick as the cyclopentadiene is added. If desired, more ether may be added to facilitate stirring. The final reaction mass is a thick white slurry of cyclopentadienylsodium. The reaction is complete when the hydrogen evolution ceases, after which the reaction product is ready for conversion to dicyclopentadienyliron or dicyclopentadienylnickel by adding a solution of a halide salt of the metal dissolved in ether. This process is described in copending application by Hobbs, Serial No. 312,658, filed October 1, 1952.

The ethers used as vehicle for the reaction between cyclopentadiene and sodium may be any symmetrical or unsymmetrical liquid lower aliphatic ether having up to 6 carbon atoms in each alkyl group. Examples of such ethers are diethyl ether, di-iso-propyl ether, di-n-butyl ether, methylethyl ether, methylpropyl ether, ethylbutyl ether, and the like. The ethers must be aliphatic since anisole and similar aromatic ethers are inoperative in the present invention.

The reaction temperature depends on the boiling point of the hydrocarbon-ether mixture, but in general, should not be allowed to rise much above 50° C., and is preferably maintained at about room temperature.

The following examples are given by way of illustration, although it is to be understood that the invention is not limited to the specific ether mentioned since any of those mentioned above may be substituted without altering the products produced by the reaction.

*Example I*

A dispersion of 34 g. of soduim in xylene was added to 100 cc. of dry ether. By titrating an aliquot of the resulting slurry, it was estimated that 12.5 g. (0.5 mol) of sodium were present. Over a period of one hour, 49.5 g. of cyclopentadiene (0.75 mol) were added uniformly and at a reaction temperature of 25° to 27° C. A vigorous reaction started quickly as indicated by the evolution of hydrogen. The sodium salt of cyclopentadiene precipitated as white crystals and the reaction mass became thicker. Addition of ether (about 1150 cc.) was necessary to maintain the reaction mass in a fluid state. Shortly after the addition of the cyclopentadiene was finished, the evolution of hydrogen stopped.

Sixty-one grams of anhydrous ferric chloride (0.375 mol) were dissolved in 210 cc. of anhydrous ether and the solution was added to the cyclopentadienylsodium slurry at 2° to 7° C. over a period of 45 minutes. The charge was then allowed to warm to room temperature and agitated for 2 hours. Then 100 cc. of alcohol were added to destroy any excess of sodium that might have been present and the charge was poured into 1000 cc. of water containing 100 g. of ammonium chloride.

The ether was allowed to evaporate and the yellow solid was filtered and extracted with benzene. Upon the evaporation of benzene, 33 g. of dicyclopentadienyliron was obtained equal to a yield of 72% based on the amount of sodium used. The corresponding nickel compound may similarly be obtained by substituting anhydrous nickel chloride for ferric chloride.

*Example II*

A dispersion of 60 g. of sodium in xylene (amounting by titration to 20–21 g. sodium) was added to 50 g. of anhydrous ether. Over a period of about 2 hours 83 g. of cyclopentadiene in ether were added while refluxing at a reaction temperature of 30–48° C. During that period an additional 225 g. of xylene and 30 g. of ether were added to prevent the reaction mass from getting too thick to be agitated. Cyclopentadienylsodium precipitated as white crystals. Upon the addition of 65 g. of anhydrous ferric chloride in ether and working up the reaction mass as described in Example I, 30 g. of dicyclopentadienyliron was obtained.

The present invention represents a simple and economical process for preparing cyclopentadienylsodium as an intermediate in a common solvent for preparing dicyclopentadienyliron or nickel. The process avoids the difficulties of the prior art in which expensive apparatus or unstable compounds are used.

It is apparent that many widely different embodiments of this invention may be made without departing from the spirit and scope thereof, and therefore, it is not intended to be limited except as indicated in the appended claims.

I claim:

1. The process for preparing cyclopentadienylsodium which comprises reacting, in a liquid medium under anhydrous conditions, cyclopentadiene with a dispersion of sodium in an inert liquid hydrocarbon, said liquid medium consisting essentially of a liquid aliphatic ether having up to 6 carbon atoms in each alkyl group.

2. The process of claim 1 in which the reaction is carried out at a temperature from about room temperature to about 50° C.

3. The process for preparing cyclopentadienylsodium which comprises reacting, in a liquid medium under anhydrous conditions, cyclopentadiene with a dispersion of sodium in xylene, said liquid medium consisting essentially of a liquid aliphatic ether having up to 6 carbon atoms in each alkyl group.

4. The process for preparing cyclopentadienylsodium which comprises reacting, in a liquid medium under anhydrous conditions, cyclopentadiene with a dispersion of sodium in an inert liquid hydrocarbon, said liquid medium consisting essentially of diethyl ether.

5. The process for preparing cyclopentadienylsodium which comprises reacting, in a liquid medium under anhydrous conditions, cyclopentadiene with a dispersion of sodium in xylene, said liquid medium consisting essentially of diethyl ether.

6. The process of claim 5 in which the reaction is carried out at a temperature from about room temperature to about 50° C.

7. The process of claim 5 in which the reaction is carried out at about room temperature.

References Cited in the file of this patent

UNITED STATES PATENTS

| Number | Name | Date |
|---|---|---|
| 2,019,832 | Scott | Nov. 5, 1935 |
| 2,027,000 | Scott | Jan. 7, 1936 |
| 2,563,074 | Schemerling | Aug. 7, 1951 |
| 2,716,662 | Cohen et al. | Aug. 30, 1955 |

OTHER REFERENCES

"The Chemistry and Utilization of Cyclopentadiene," Wilson et al., reprinted from Chemical Reviews, vol. 34, No. 1, Feb. 1944, pages 1 to 5.

"Handling Sodium in Organic Reactions," Hansley, Ind. and Eng. Chem., vol. 43, No. 8, August 1951, pages 1759–65.